United States Patent
Gangal (10) Patent No.: US 11,736,294 B2
(45) Date of Patent: Aug. 22, 2023

(54) ROOT-OF-TRUST BLOCKCHAIN VERIFICATION

(71) Applicant: Infineon Technologies AG, Neubiberg (DE)

(72) Inventor: Vinodkumar Gangal, Vidayagiri (IN)

(73) Assignee: Infineon Technologies AG, Neubiberg (DE)

( * ) Notice: Subject to any disclaimer, the term of this patent is extended or adjusted under 35 U.S.C. 154(b) by 22 days.

(21) Appl. No.: 16/833,700

(22) Filed: Mar. 30, 2020

(65) Prior Publication Data

US 2020/0328892 A1 Oct. 15, 2020

(30) Foreign Application Priority Data

Apr. 11, 2019 (DE) ...................... 10 2019 109 560.3

(51) Int. Cl.
*H04L 9/32* (2006.01)
*H04L 9/08* (2006.01)
*H04L 9/00* (2022.01)

(52) U.S. Cl.
CPC .......... *H04L 9/3218* (2013.01); *H04L 9/0825* (2013.01); *H04L 9/3236* (2013.01);
(Continued)

(58) Field of Classification Search
CPC ... H04L 9/3218; H04L 9/0825; H04L 9/3236; H04L 9/3247; H04L 9/3297; H04L 2209/38
See application file for complete search history.

(56) References Cited

U.S. PATENT DOCUMENTS

2016/0218879 A1* 7/2016 Ferrin ................. H04L 9/3236
2016/0239934 A1   8/2016 Soborski
(Continued)

FOREIGN PATENT DOCUMENTS

WO    2019067798 A1   4/2019

OTHER PUBLICATIONS

Jain, Suraj et al. "How does a public key verify a signature" [online] StackOverFlow, Jan. 28, 2018 [retrieved Aug. 26, 2021]. Retrieved from the Internet: URL: https://stackoverflow.com/questions/18257185/how-does-a-public-key-verify-a-signature (Year: 2018).*
(Continued)

*Primary Examiner* — Linglan Edwards
*Assistant Examiner* — Joshua Raymond White
(74) *Attorney, Agent, or Firm* — Viering, Jentschura & Partner mbB; Benjamin L. von Rueden (57) ABSTRACT

A root-of-trust device includes one or more processors configured to receive a candidate block identifier corresponding to a block number of a candidate block of a distributed electronic ledger; receive one or more verified block identifiers each corresponding to a block number of one or more verified blocks; compare the received candidate block identifier with a block identifier in the stored one or more verified block identifiers; and in the case that the comparing of the candidate block identifier to the block identifier in the stored one or more verified block identifiers satisfies a predetermined condition, verify the candidate block corresponding to the candidate block identifier and send data corresponding to a verified block of the distributed electronic ledger.

23 Claims, 4 Drawing Sheets

(52) U.S. Cl.
CPC .......... *H04L 9/3247* (2013.01); *H04L 9/3297* (2013.01); *H04L 9/50* (2022.05)

(56) References Cited

U.S. PATENT DOCUMENTS

| | | | | |
|---|---|---|---|---|
| 2016/0284033 | A1* | 9/2016 | Winand | G06Q 20/145 |
| 2018/0337769 | A1 | 11/2018 | Gleichauf | |
| 2018/0343126 | A1* | 11/2018 | Fallah | H04L 9/3297 |
| 2019/0173667 | A1* | 6/2019 | Wang | G06F 21/31 |
| 2019/0303932 | A1* | 10/2019 | Klaedtke | H04L 9/0637 |
| 2019/0370806 | A1* | 12/2019 | Wang | H04L 9/3297 |
| 2019/0394047 | A1* | 12/2019 | Karame | G06F 21/64 |
| 2020/0007513 | A1* | 1/2020 | Gleichauf | G06F 8/65 |
| 2020/0106623 | A1* | 4/2020 | Andreina | H04L 9/3263 |
| 2020/0186523 | A1* | 6/2020 | Kursun | H04L 9/0894 |
| 2020/0228318 | A1* | 7/2020 | Karame | H04L 9/0637 |
| 2021/0119778 | A1* | 4/2021 | Cheng | H04L 9/3268 |
| 2021/0209885 | A1* | 7/2021 | Lundin | G07C 13/00 |

OTHER PUBLICATIONS

Nxtwiki; "Nxt Whitepaper"; 21 pages; retrieved on Apr. 21, 2020 from https://nxtwiki.org/wiki/Whitepaper:Nxt#Nxt.E2.80.99s_Proof_of_Stake_Model.

Martinez, J.; "Understanding Proof of Stake: The Nothing at Stake Story"; Jun. 7, 2018; 4 pages; retrieved on Apr. 21, 2020 from https://medium.com/coinmonks/understanding-Proof of Stake-the-nothing-at-stake-theory-1f0d71bc027.

Wikipedia; "Proof of stake"; Mar. 25, 2020; 3 pages; retrieved on Apr. 21, 2020 from https://en.wikipedia.org/wiki/Proof of Stake.

Security; "Nothing Considered: A look at Nothing at Stake Vulnerability for Cryptocurrencies"; Apr. 9, 2017; 7 pages; retrieved on Apr. 21, 2020 from https://pivx.org/nothing-considered-a-look-at-nothing-at-stake-vulnerability-for-cryptocurrencies/.

S., J.; "Blockchain explained: how 51% attack works (double spend attack)"; May 5, 2018; 7 pages; retrieved on Apr. 21, 2020 from https://medium.com/coinmonks/what-is-a-51-attack-or-double-spend-attack-aa108db63474.

Begicheva, A. et al.; "Fair Proof of Stake"; May 18, 2018; pp. 1-13; retrieved on Apr. 21, 2020 from https://webcache.googleusercontent.com/search?q=cache:KQs0MhsZjvoJ:https://forum.wavesplatform.com/uploads/default/original/1X/b9f220c13f73c3a41dff7f45-23c6c4a1fc03ebf6.pdf+&cd=2&hl=de&ct=clnk&gl=de&client=firefox-b-d.

Blockchain Council; "How Exactly is Proof-Of-Stake Implemented?"; Jan. 28, 2018; 7 pages; retrieved on Apr. 21, 2020 from https://www.blockchain-council.org/blockchain/exactly-proof-stake-implemented/.

Yaffe, L. et al.; "About Nxt Platform"; 3 pages; retrieved on Apr. 21, 2020 from https://icoindex.com/profile/nxt-platform-nxt.

Sandberg, J.-E.; "Blockchain Fundamentals"; 4 pages; retrieved on Apr. 21, 2020 from https://app.pluralsight.com/library/courses/blockchain-fundamentals/transcript.

German Search Report based on Application No. 10 2019 109 560.3, dated Jan. 9, 2020, 8 pages (for reference purpose only).

\* cited by examiner

ROOT-OF-TRUST BLOCKCHAIN VERIFICATION

CROSS-REFERENCE TO RELATED APPLICATIONS

This applicant claims priority to German Application DE 10 2019 109 560.3, filed on Apr. 11, 2019, the entirety of which is incorporated herein by reference.

TECHNICAL FIELD

[1] Various embodiments relate generally to blockchain mining.

BACKGROUND

[2] Blockchains may employ a consensus algorithm, which creates a structured means for widespread acceptance of a newly-added block while helping to improve security and prevent fraud. Two current consensus algorithms for blockchain mining include: proof of work (PoW) and proof of stake (PoS).

In PoW, the ability to mine blocks is predicated upon the ability to solve a complex mathematical problem. The problems are generally selected such that they are mathematically rigorous and require significant resources to solve the problem in a competitive fashion. Prospective miners compete to be the first to solve the problem. The first miner to solve the problem broadcasts the solution to the network, is permitted to mine a block, and generally receives a reward. PoW theoretically increases security and reduces fraud by greatly increasing the cost of fraudulent mining attempts, due to the significant computational resources that are necessary to compete in the PoW system. Many blockchain systems, such as Bitcoin, for example, currently employ Proof of Work.

PoW, however, includes a disadvantage with respect to power consumption. Because the mathematical problems for PoW are quite computationally demanding, prospective miners require large amounts of electrical energy to compete in a PoW system. Given the large number of potential miners who may compete in a PoW system, the power requirement for PoW may be quite vast. It is expected that the power requirements for Bitcoin's PoW system may soon be comparable to the power usage of certain small developed nations. It is desirable to create a less power-demanding alternative to the security problem that PoW solves.

Another consensus algorithm is PoS. In PoS, the miner of a new block is chosen deterministically based on wealth, said wealth being referred to as a stake. PoS may be carried out without solving the complex mathematical problem that may be used in PoW, and therefore the computational resources that are necessary for PoW are significantly reduced. Thus, PoS demands less energy, and therefore may be more efficient than PoW. Accordingly, certain blockchain systems have indicated an interest in converting from a PoW-based system to a PoS-based system.

One possible disadvantage of converting from PoW to PoS is an at least theoretical reduction in security. For the reasons stated above, minors in a PoW system may be required to make very significant financial investments to become competitive, and therefore they are highly incentivized to mine fairly and avoid fraudulent transactions. Theoretically, PoS miners (who may also be called "forgers") are required to hold a stake in the cryptocurrency, and therefore are the guardians of their own wealth. In theory, this may provide some amount of security; however, it is believed that, at least due to the different inventive structure, PoS systems may be more subject to attempts at fraudulent transactions than PoW systems.

One type of such fraudulent transaction is known as "double spending." In a double-spending transaction, a forger completes a transaction in which a currency is sent. The forger then establishes a fork in the transaction chain and may create a transaction in which the forger is the recipient of the currency amount. Using various methods, such as, for example, relying on the fraudulent fork to be accepted based on it being the longest chain, the forked chain with the fraudulent transaction may ultimately be accepted within the block and added to the blockchain register. It is desired to reduce the risk of double-spending in a PoS system.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any embodiment or design described herein as "exemplary" is not necessarily to be construed as preferred or advantageous over other embodiments or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Within the PoW context, the process of verifying a block and adding the verified block to the blockchain is generally known as block mining, and the persons who perform said block mining are generally referred to as miners. Within the PoS context, the process of verifying a block and adding the block to the blockchain may sometimes be referred to as forging, and the persons who perform these activities may be known as forgers. In order to simplify the terminology, the term "mining" is used herein to describe the process of verifying a block and adding the verified block to the blockchain, irrespective of the consensus algorithm used, whether PoW, PoS, or otherwise.

A blockchain consensus algorithm may be configured to require a hardware root-of-trust for block mining.

This hardware root-of-trust may be used to validate transactions and thus reduce the risk of a successful double-spending attack. The hardware root-of-trust may store one or more keys and at least one last verified block number.

The consensus algorithm may require that the hardware root-of-trust be mandatory for verification of transactions and/or blocks. The hardware root-of-trust may have an asymmetric key pair, which is used for block verification. Along with the block data, the miner may add the miner's public key information in to the block. The miner may send the block to the hardware root-of-trust, and the hardware root-of-trust may verify the transaction. Only if the transactions satisfy one or more security criteria, will the hardware root-of-trust verify and return the data for inclusion in the blockchain. In the event that the hardware root-of-trust verifies and returns the data, the verification information may be added to the block; the hash may be calculated; and the block may be added to the blockchain.

According to one aspect of the disclosure, the blockchain consensus algorithm may require a miner to possess a hardware root-of-trust to verify a transaction and/or block. By requiring the hardware root-of-trust, prospective miners may be awarded mining privileges or excluding from mining based on any desired factors or assessment of risk.

Figure 1:
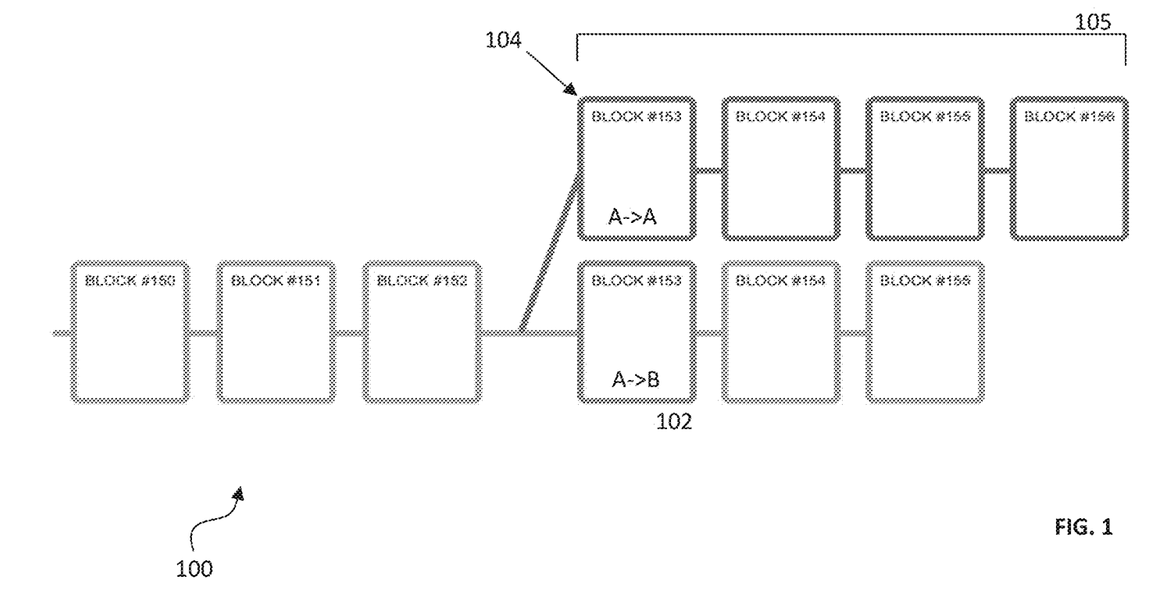
FIG. 1 depicts a manner of carrying out a double-spending attack.

FIG. 1 depicts a manner of carrying out a double-spending attack 100. In this Figure, blocks 150-152 are established. Miner A issues a transaction in which Miner A transfers currency to User B, as recorded in the lower block 153 and shown as element 102. User B receives notification of the transfer and may perform a transaction in response, such as performing a service for, or sending a good to, Miner A. Additional blocks may be established, based on lower block 152, depicted as element 102. In this manner, lower block 152 continues in a chain that includes lower block 154 and lower block 155. After recording transmission of the funds to User B, Miner A may create a fork in the chain by establishing a new block with an identical block number as depicted in upper block 153, which is depicted as element 104. Miner A may record a nefarious transaction in the forked block, such as recording the currency being transferred to Miner A (see transfer in new block 104). In this manner, double spending is attempted.

Miner A may desire for the new block with the identical block number (e.g. a forked block) 104 to ultimately be accepted by the consensus algorithm. One strategy to increase the likelihood of acceptance is to increase the length of the forked chain 105 that begins with 104, since the consensus algorithm may be configured to accept the longest chain. Miner A may record multiple continuous blocks with the goal of lengthening the forked chain extending from upper block 153 as depicted in 105. If the longer forked chain 105 is ultimately accepted, the transfer of currency to User B will not be recorded, despite Miner A potentially having already reaped the benefit of the non-recorded transfer by receiving the corresponding good or service. As this impairs user trust in the blockchain, this is to be avoided.

Figure 2:
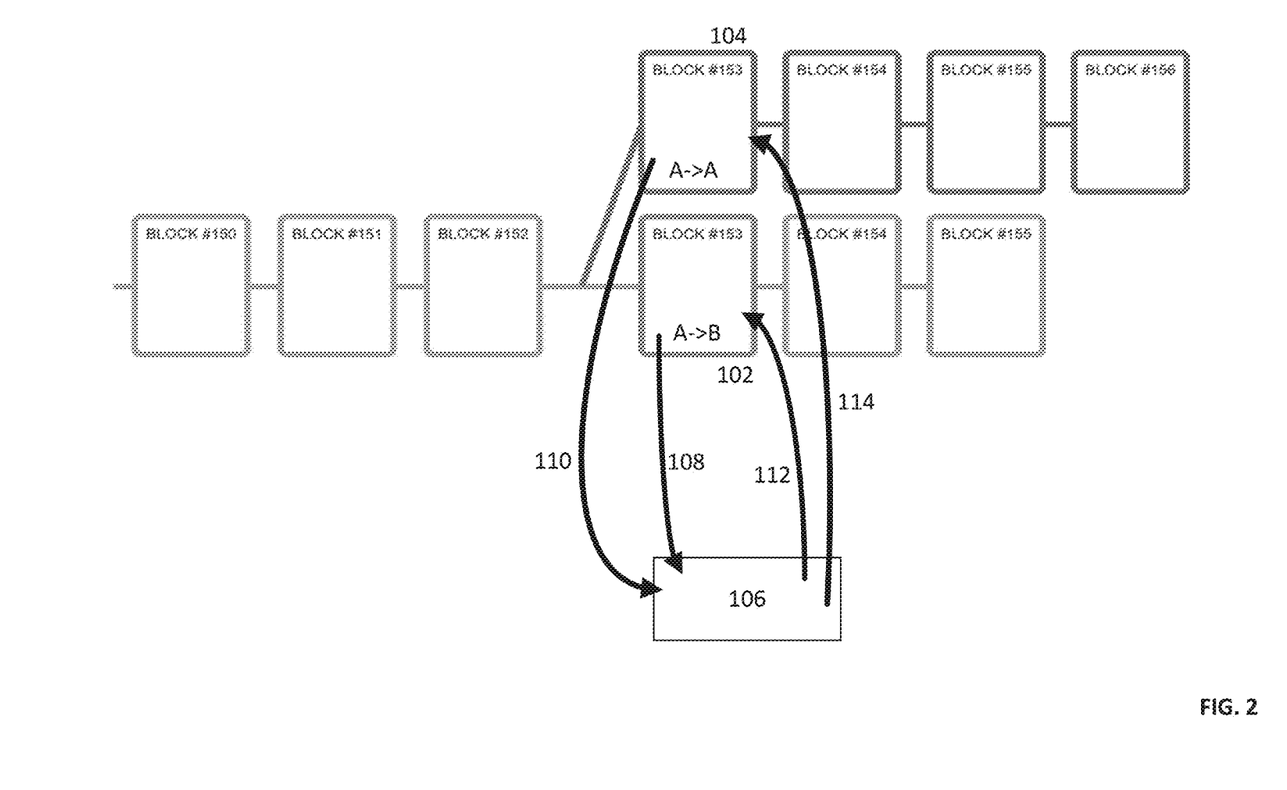
FIG. 2 depicts rejection of a double-spending attack using a hardware root-of-trust.

FIG. 2 depicts rejection of a double-spending attack using a hardware root-of-trust. In this figure, the consensus algorithm requires a hardware root-of-trust 202 to mine blocks. As described herein, the hardware root of trust may be issued to a prospective miner by an issuing authority according to any desired criteria. Upon an attempt to mine a block, certain block information including at least the block number to be mined or information representing the block number to be mined 108 is transmitted to the hardware root-of-trust 202. The hardware root-of-trust 202 may include a memory to store at least a last verified block number. When the hardware root-of-trust 202 receives a block number or information representing a block number to be mined 108, the hardware root-of-trust 202 compares the block number or information representing the block number at least to a block number of the last verified block. In the event that the block number to be mined is neither duplicative of or earlier than the last stored block number, and subject to any other criteria that are implemented with respect to the hardware root-of-trust 202, the hardware root-of-trust 202 may verify the proposed block. On the other hand, in the event that the hardware root-of-trust 202 determines that the proposed block number for mining is duplicative of, or earlier than, the stored block number of the last verified block, the hardware root-of-trust 202 may reject the block. For example, in the double-spending attempt described above, after verifying lower block 153 in element 112, Miner A creates a fork with a new block 153 as depicted in element 104. Miner A attempts to verify forked block 153, element 104, by transmitting at least the block number or information representing the block number 110 to the hardware root-of-trust 202. The hardware root-of-trust 202 compares the received block number or information representing the block number at least to the stored last verified block number. In this manner, the hardware root-of-trust 202 determines that new block 153, element 104, has a duplicative block number, which indicates that a fork has occurred. The hardware root-of-trust 202 may transmit a rejection 114 of newly forked block 153, element 104.

According to one aspect of the disclosure, the secure element stores a block number from at least the last block that was mined. In the event that the hardware root-of-trust detects an attempt to mine a block that has block number that is duplicative of a last mined block, or a block number that is previous to the last mined block, the hardware root-of-trust may prevent the signing of such a transaction. In this manner, the hardware root-of-trust ensures that a miner cannot mine two of the same block numbers with the same hardware root-of-trust.

According to another aspect of the disclosure, the hardware root-of-trust may also log the number of rejected transactions and/or detected double-spending attempts. The hardware root-of-trust may be configured with a predetermined threshold for this number of rejected transactions and/or detected double-spending attempts. The predetermined threshold may be a predetermined number, or a number based on a predetermined formula or algorithm. If the hardware root-of-trust reaches the predetermined threshold value, the hardware root-of-trust may become blocked or deauthorized, such that the hardware root-of-trust could no longer perform mining functions. Alternatively or additionally, the issuing authority for the hardware root-of-trust may revoke the miner's mining permissions, such as by locking or deactivating the hardware root-of-trust. In this case, the miner owning or in possession of the hardware root-of-trust would no longer be able to mine.

According to another aspect of the disclosure, the hardware root-of-trust may be configured to delay block verification according to a predetermined duration, or to only verify blocks according to a predetermined schedule. For example, the hardware root-of-trust may be configured to prohibit block-verification until a predetermined duration since the last block verification has elapsed. This duration may be every n minutes, for example, every 5 minutes, every 10 minutes, or otherwise. This duration may be configured to any amount of time, without limitation. By requiring a predetermined duration to elapse, double spending may be further prevented, since the resulting delay precludes rapid mining of continuous blocks. In a double-spending attack, a miner introduces a fork in the blockchain, said fork often including a transaction such as a transfer of currency to the miner or a reversal of a payment. The miner desires that the forked line of blocks becomes accepted into the blockchain and verified. One way of increasing the likelihood of the forked lines of blocks being accepted and verified is to mine multiple continuous blocks, thereby making the fork longer than the original line (the non-forked line). Because consensus algorithms often give preference to a longest chain, a fork that has been made longer than non-forked lines of blocks may have a greater chance of acceptance. As such, it may be desirable to limit the frequency with which a miner can mine continuous blocks since this optional implementation of a predetermined delay between mining largely limits the ability of a miner to rapidly mine continuous blocks and thus reduces the risk of acceptance of a forked line of blocks in a double-spending attack.

According to another aspect of the disclosure, additional security against double spending may be gained by requiring the forger's stake to be stored on the hardware root-of-trust. Assuming a PoS implementation, the forger must generally demonstrate a stake before being granted the ability to mine a block. This requirement of possessing a stake is generally believed to implement additional security over allowing those without a stake to mine, as those with a stake are incentivized to protect the system from which their stake derives value. However, security can be further improved by requiring the stake to be stored on the hardware root-of-trust. In this case, and in the event that a double-spending attack is detected, the putative double-spender may lose access to the stake. It is believed that the threat of losing one's stake may be a greater deterrent from double-spending than the threat of potentially diminishing the value of the stake. A minimum number of coins or a minimum stake to obtain the hardware root-of-trust may be adjusted to further disincentivize double spending. For example, the minimum stake may be adjusted to be high, thereby ensuring that those who might otherwise have the possibility of attempting a double-spending attack also have the most to lose if they are unsuccessful. If it is determined that too few miners qualify for the hardware root-of-trust in light of the high stake, the stake can be reduced.

Figure 3:
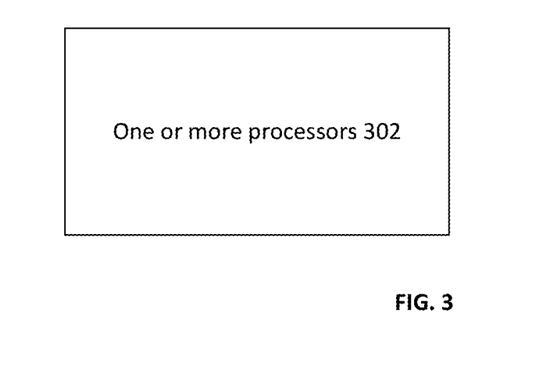
FIG. 3 depicts a root-of-trust device comprising one or more processors.

FIG. 3 depicts a root-of-trust device comprising one or more processors 302 configured to: receive a candidate block identifier corresponding to a block number of a candidate block of a distributed electronic ledger; receive one or more verified block identifiers each corresponding to a block number of one or more verified blocks; compare the received candidate block identifier with a most recent block identifier in the stored one or more verified block identifiers; and in the case that the comparing of the candidate block identifier to the block identifier in the stored one or more verified block identifiers satisfies a predetermined condition, verify the candidate block corresponding to the candidate block identifier and send data corresponding to a verified block of the distributed electronic ledger. The comparison of candidate block identifier to stored block identifier may be performed in a variety of manners, such as comparing the candidate block identifier to a most recent verified block identifier, to a greatest or highest block identifier, or otherwise.

The hardware root-of-trust may be configured as a non-transient computer readable medium comprising instructions, which, when executed, cause one or more processors to perform the methods and/or functions disclosed herein. These instructions may optionally be instructions pursuant to Java Card and stored as a Java Card applet. The hardware root-of-trust may be configured a card or smart card, said card or smart card including at least one or more processors configured to perform the methods and/or functions described herein according to the instructions.

Figure 4:
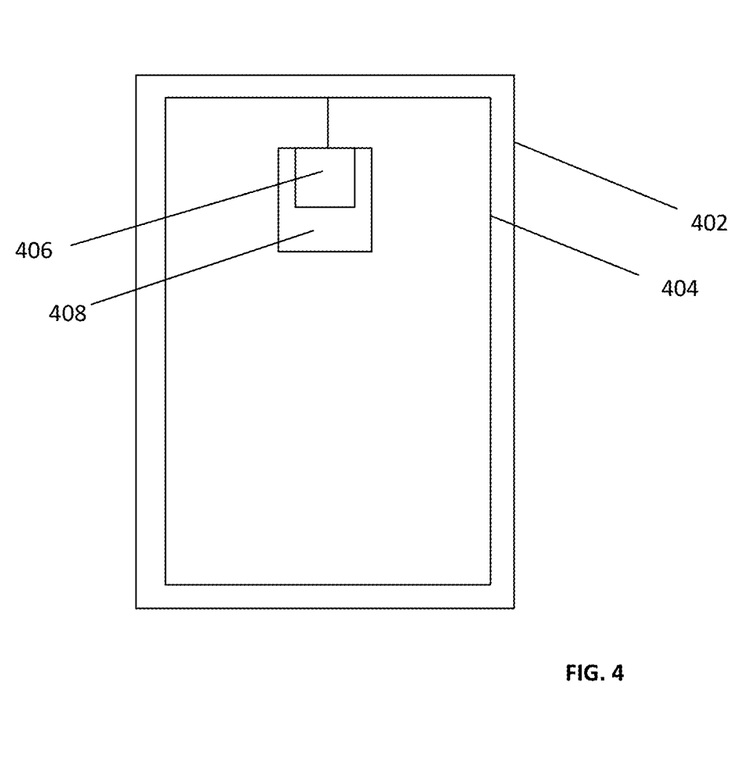
FIG. 4 depicts a hardware root-of-trust according to an aspect of the disclosure, configured as a smart card.

FIG. 4 depicts such a smart card. The smart card may include a carrier 402 dimensioned according to any desired shape or standard; an optional antenna 404, configured to inductively or capacitive couple with a card reader; optional electrical contacts, configured to establish a galvanic coupling with a card reader; and one or more processors 408 configured to receive a candidate block identifier corresponding to a block number of a candidate block of a distributed electronic ledger; receive one or more verified block identifiers each corresponding to a block number of one or more verified blocks; compare the received candidate block identifier with a most recent block identifier in the stored one or more verified block identifiers; and in the case that the comparing of the candidate block identifier to the block identifier in the stored one or more verified block identifiers satisfies a predetermined condition, verify the candidate block corresponding to the candidate block identifier and send data corresponding to a verified block of the distributed electronic ledger.

Figure 5:
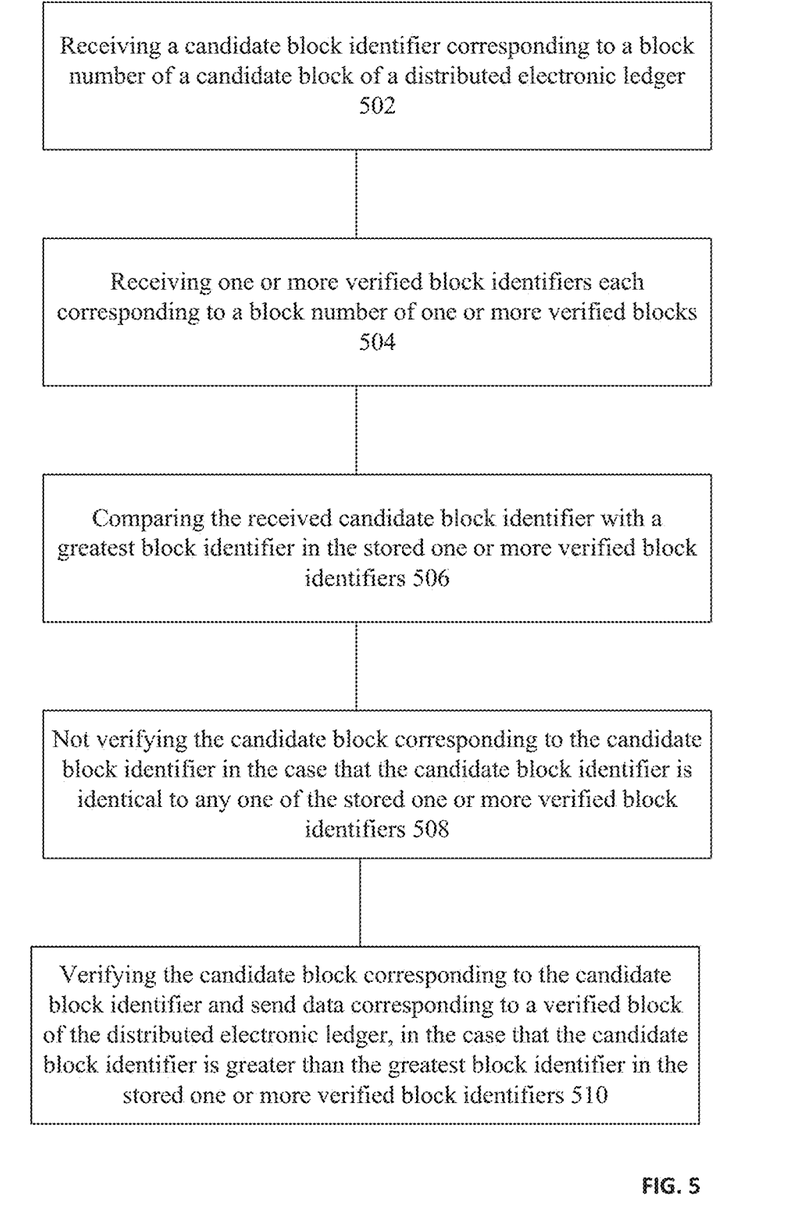
FIG. 5 depicts a method of root-of-trust blockchain verification.

FIG. 5 depicts a method of root-of-trust blockchain verification comprising receiving a candidate block identifier corresponding to a block number of a candidate block of a distributed electronic ledger 502; receiving one or more verified block identifiers each corresponding to a block number of one or more verified blocks 504; comparing the received candidate block identifier with a most recent block identifier in the stored one or more verified block identifiers 506; not verifying the candidate block corresponding to the candidate block identifier in the case that the candidate block identifier is identical to any one of the stored one or more verified block identifiers 508; and verifying the candidate block corresponding to the candidate block identifier and send data corresponding to a verified block of the distributed electronic ledger, in the case that the comparing of the candidate block identifier to the stored one or more verified block identifiers satisfies a predetermined condition 510. The predetermined condition may include at least one of the candidate block identifier being greater than the stored one or more verified block identifiers, the candidate block being more recent than the stored one or more verified blocks, and/or the candidate block identifier not being duplicative of any of the store one or more block identifiers.

The hardware root-of-trust may comprise an applet, which may be configured to further store an asymmetric key pair for block verification. For example, the asymmetric key pair may be a key pair according to Rivest-Shamir-Adleman (RSA), elliptic-curve cryptography (ECC), or any other suitable cryptography system.

The hardware root-of-trust may comprise a large persistent number counter to store one or more block numbers. The hardware root-of-trust may be configured to store only a block number corresponding to a last verified block or information representing a block number corresponding to a last verified block. In this manner, any attempts to mine a block with a block number that has already been mined will be rejected, since mining of two different blocks with an identical block number or identical corresponding information may indicate a fork in the blockchain and potentially a double spending attack. That is, forking requires that two blocks have the same number, which is not permitted by the hardware root-of-trust, as the block numbers have to be the same when the chain is forked. In such a case, the block number cannot be the same as it would have already been incremented after verifying the transaction. Alternatively, the hardware root-of trust may be configured to store a plurality of mined block numbers. This may include any number of previously mined blocks, extending potentially to the beginning of the blockchain.

The hardware root-of-trust may comprise a counter, which is configured to increment a block number. That is, counter may be incremented with each verified block, thereby keeping a running count corresponding to the number of verified blocks in the blockchain. The counter number may be stored on the hardware root-of-trust for use in block verification as described herein.

According to another aspect of the disclosure, the hardware root-of-trust may be configured to utilize one or more forms of secure coding to prevent block number manipulation. In this manner, any identified and unauthorized attempts to manipulate the block number may be flagged or otherwise identified. Such block number manipulation may result in disablement of the block, or otherwise preventing the block from being incorporated into the blockchain.

The hardware root-of-trust may be issued according to any criteria for securing the blockchain. It is envisaged that one or more institutions, consortiums, or other authorities may be responsible for issuing the hardware root-of-trust to prospective miners. This can be achieved according to any desired criteria. For example, the authority may issue a miner the hardware root-of-trust based on the miner's stake. The authority may be authorized to deactivate or revoke a hardware root-of-trust to maintain the security of the blockchain.

In the following, various examples are provided with reference to the aspects described above.

In Example 1, a root-of-trust device is disclosed comprising one or more processors configured to receive a candidate block identifier corresponding to a block number of a candidate block of a distributed electronic ledger; receive one or more verified block identifiers each corresponding to a block number of one or more verified blocks; compare the received candidate block identifier with a greatest block identifier in the stored one or more verified block identifiers; and in the case that the candidate block identifier is greater than the greatest block identifier in the stored one or more verified block identifiers, verify the candidate block corresponding to the candidate block identifier and send data corresponding to a verified block of the distributed electronic ledger.

In Example 2, the root-of-trust device of Example 1 is disclosed, wherein the one or more processors are further configured, in the case that the candidate block identifier is identical to any one of the stored one or more verified block identifiers, to decline verification of the candidate block corresponding to the candidate block identifier.

In Example 3, the root-of-trust device of Example 1 or 2 is disclosed, wherein the one or more processors are further configured, in the case that the candidate block identifier is greater than the greatest block identifier in the stored one or more verified block identifiers, to increment a block number counter to an identifier greater than the candidate block identifier.

In Example 4, the root-of-trust device of any one of Examples 1 to 3 is disclosed, wherein, the root-of-trust device further comprises a memory, configured to store the one or more verified block identifiers each corresponding to a block number of one or more verified blocks.

In Example 5, the root-of-trust device of any one of Examples 1 to 3 is disclosed, wherein the root-of-trust device further comprises a memory, configured to store a verified block identifier corresponding to a last verified block number of one or more verified blocks.

In Example 6, the root-of-trust device of Example 4 or 5 is disclosed, wherein the memory is further configured to store a public key, a private key, or an asymmetric key pair.

In Example 7, the root-of-trust device of Example 6 is disclosed, wherein the public key, the private key, or the asymmetric key pair is a Rivest-Shamir-Adleman key or key pair.

In Example 8, the root-of-trust device of Example 6 is disclosed, wherein the public key, the private key, or the asymmetric key pair is an elliptic-curve cryptography key or key pair.

In Example 9, the root-of-trust device of any one of Examples 1 to 8 is disclosed, wherein the one or more processors are further configured to insert a public authentication key into the candidate block if the one or more processors verify the candidate block.

In Example 10, the root-of-trust device of any one of Examples 1 to 9 is disclosed, wherein the one or more processors are further configured to store in a memory a block number of the verified block.

In Example 11, the root-of-trust device of any one of Examples 1 to 10 is disclosed, wherein the one or more processors are further configured to determine a block number of the candidate block by incrementing a block number of a last verified block.

In Example 12, the root-of-trust device of any one of Examples 1 to 11 is disclosed, wherein the one or more processors are further configured, in the case that the candidate block identifier is identical to any one of the stored one or more verified block identifiers, to log a user identifier corresponding to a user submitting the candidate block for verification.

In Example 13, the root-of-trust device of Example 12 is disclosed, wherein the one or more processors are further configured not to verify a candidate block corresponding to the user identifier for whom a predetermined number of candidate blocks were not verified based on their candidate block identifier being identical to any one of the stored one or more verified block identifiers.

In Example 14, the root-of-trust device of any one of Examples 1 to 13 is disclosed, wherein the one or more processors are further configured to delay verification of a candidate block until completion of a predetermined time duration.

In Example 15, the root-of-trust device of Example 14 is disclosed, wherein the predetermined time duration is, for example, 5 minutes.

In Example 16, the root-of-trust device of any one of Examples 1 to 15 is disclosed, wherein the one or more processors are further configured to store in a memory a user stake.

In Example 17, the root-of-trust device of Example 16 is disclosed, wherein the user stake is a user stake according to a proof of stake algorithm.

In Example 18, the root-of-trust device of any one of Examples 1 to 17 is disclosed, wherein verifying the candidate block comprises verifying a block signature of the candidate block and signing the block according to one or more digital keys.

In Example 19, the root-of-trust device of any one of Examples 1 to 18 is disclosed, wherein verifying the candidate block comprises verifying a hash value of the candidate block by recalculating the hash value.

In Example 20, the root-of-trust device of Example 18 or 19 is disclosed, wherein verifying the candidate block comprises signing the block according to one or more digital keys.

In Example 21, the root-of-trust device of any one of Examples 1 to 20 is disclosed, wherein the one or more processors are further configured to determine a user stake and compare the determined user stake to a predetermined user stake threshold, and in the case that the user stake is less than the predetermined user stake threshold, to disable verification of the candidate block.

In Example 22, a method of root-of-trust blockchain verification is disclosed comprising: receiving a candidate block identifier corresponding to a block number of a candidate block of a distributed electronic ledger; receiving one or more verified block identifiers each corresponding to a block number of one or more verified blocks; comparing the received candidate block identifier with a greatest block identifier in the stored one or more verified block identifiers; not verifying the candidate block corresponding to the candidate block identifier in the case that the candidate block identifier is identical to any one of the stored one or more verified block identifiers; and verifying the candidate block corresponding to the candidate block identifier and send data corresponding to a verified block of the distributed electronic ledger, in the case that the candidate block identifier is greater than the greatest block identifier in the stored one or more verified block identifiers.

In Example 23, the method of root-of-trust blockchain verification of Example 22 is disclosed, wherein the one or more processors are further configured, in the case that the candidate block identifier is identical to any one of the stored one or more verified block identifiers, to decline verification of the candidate block corresponding to the candidate block identifier.

In Example 24, the method of root-of-trust blockchain verification of any one of Examples 22 to 23 is disclosed, further comprising, in the case that the candidate block identifier is greater than the greatest block identifier in the stored one or more verified block identifiers, incrementing a block number counter to an identifier greater than the candidate block identifier.

In Example 25, the method of root-of-trust blockchain verification of any one of Examples 22 to 24 is disclosed, further comprising storing on a memory the one or more verified block identifiers each corresponding to a block number of one or more verified blocks.

In Example 26, the method of root-of-trust blockchain verification of any one of Examples 22 to 24 is disclosed, further comprising storing on a memory a verified block identifier corresponding to a last verified block number of one or more verified blocks.

In Example 27, the method of root-of-trust blockchain verification of any one of Examples 25 to 26 is disclosed, further comprising storing on the memory a public key, a private key, or an asymmetric key pair.

In Example 28, the method of root-of-trust blockchain verification of Example 27 is disclosed, wherein the public key, the private key, or the asymmetric key pair is a Rivest-Shamir-Adleman key or key pair.

In Example 29, the method of root-of-trust blockchain verification of Example 27 is disclosed, wherein the public key, the private key, or the asymmetric key pair is an elliptic-curve cryptography key or key pair.

In Example 30, the method of root-of-trust blockchain verification of any one of Examples 22 to 29 is disclosed, further comprising inserting a public authentication key into the candidate block if the one or more processors verify the candidate block.

In Example 31, the method of root-of-trust blockchain verification of any one of Examples 22 to 30 is disclosed, further comprising storing in a memory a block number of the verified block.

In Example 32, the method of root-of-trust blockchain verification of any one of Examples 23 to 31 is disclosed, further comprising determining a block number of the candidate block by incrementing a block number of a last verified block.

In Example 33, the method of root-of-trust blockchain verification of any one of Examples 22 to 32 is disclosed, further comprising, in the case that the candidate block identifier is identical to any one of the stored one or more verified block identifiers, logging a user identifier corresponding to a user submitting the candidate block for verification.

In Example 34, the method of root-of-trust blockchain verification of Example 33 is disclosed, further comprising disabling verification of a candidate block corresponding to the user identifier for whom a predetermined number of candidate blocks were not verified based on their candidate block identifier being identical to any one of the stored one or more verified block identifiers.

In Example 35, the method of root-of-trust blockchain verification of any one of Examples 22 to 34 is disclosed, further comprising delaying verification of a candidate block until completion of a predetermined time duration.

In Example 36, the method of root-of-trust blockchain verification of Example 35 is disclosed, wherein the predetermined time duration is approximately 5 minutes.

In Example 37, the method of root-of-trust blockchain verification of any one of Examples 22 to 36 is disclosed, further comprising storing in a memory a user stake.

In Example 38, the method of root-of-trust blockchain verification of Example 37 is disclosed, wherein the user stake is a user stake according to a proof of stake algorithm.

In Example 39, the method of root-of-trust blockchain verification of any one of Examples 22 to 38 is disclosed, wherein verifying the candidate block comprises verifying a block signature of the candidate block and signing the block according to one or more digital keys.

In Example 40, the method of root-of-trust blockchain verification of any one of Examples 22 to 39 is disclosed, wherein verifying the candidate block comprises verifying a hash value of the candidate block by recalculating the hash value.

In Example 41, the method of root-of-trust blockchain verification of Example 39 or 40 is disclosed, wherein verifying the candidate block comprises signing the block according to one or more digital keys.

In Example 42, the method of root-of-trust blockchain verification of any one of Examples 22 to 41 is disclosed, further comprising determining a user stake and comparing the determined user stake to a predetermined user stake threshold, and in the case that the user stake is less than the predetermined user stake threshold, disabling verification of the candidate block.

In Example 43, a non-transient computer readable medium is disclosed configured to cause one or more processors to perform the method of any one of Examples 22 to 42.

In Example 44, a means for root-of-trust based blockchain verification is disclosed comprising: one or more processing means for: receiving a candidate block identifier corresponding to a block number of a candidate block of a distributed electronic ledger; receiving one or more verified block identifiers each corresponding to a block number of one or more verified blocks; comparing the received candidate block identifier with the stored one or more verified block identifiers; in the case that the candidate block identifier is identical to any one of the stored one or more verified block identifiers, not verifying the candidate block corresponding to the candidate block identifier; and in the case that the candidate block identifier is not identical to any one of the stored one or more verified block identifiers, verifying the candidate block corresponding to the candidate block identifier and send data corresponding to a verified block of the distributed electronic ledger.

In Example 45, a root-of-trust device is disclosed comprising: one or more processors configured to: receive a candidate block identifier corresponding to a block number of a candidate block of a distributed electronic ledger; receive one or more verified block identifiers each corresponding to a block number of one or more verified blocks; compare the received candidate block identifier with the stored one or more verified block identifiers; in the case that the candidate block identifier is identical to any one of the stored one or more verified block identifiers, to decline verification of the candidate block corresponding to the candidate block identifier; and in the case that the candidate block identifier is not identical to any one of the stored one or more verified block identifiers, verify the candidate block corresponding to the candidate block identifier and send data corresponding to a verified block of the distributed electronic ledger.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A device comprising:
  a security controller, the security controller comprising:
  a memory; and
  one or more processors:
    wherein the security controller is configured to receive a candidate block identifier corresponding to a block number of a candidate block of a distributed electronic ledger; and
    receive one or more verified block identifiers each corresponding to a block number of one or more verified blocks and to store the one or more verified block identifiers in the memory;
    wherein the one or more processors are configured to compare the received candidate block identifier with a block identifier in the stored one or more verified block identifiers; and
    upon determining that the comparing of the candidate block identifier to the block identifier in the stored one or more verified block identifiers satisfies a predetermined condition, the security controller is configured to verify the candidate block corresponding to the candidate block identifier and to send data corresponding to a verified block of the distributed electronic ledger;
    wherein the one or more processors are further configured to store a user stake in a memory of the security controller, and wherein the one or more security processors are configured to deny access to the stake when the comparing of the candidate block identifier to the block identifier of the one or more verified block identifiers does not satisfy the predetermined condition;
    wherein the security controller is configured as, or as a component of, a physical electronic authorization device that is configured to be removably coupled with a blockchain mining device.

2. The device of claim 1, wherein the one or more processors are further configured, when the candidate block identifier is identical to or less than any one of the stored one or more verified block identifiers, to decline verification of the candidate block corresponding to the candidate block identifier.

3. The device of claim 1, wherein the one or more processors are further configured, when the comparing of the candidate block identifier to the block identifier in the stored one or more verified block identifiers satisfies the predetermined condition, to increment a block number counter to an identifier greater.

4. The device of claim 1, wherein the root-of-trust device further comprises a memory, configured to store a verified block identifier corresponding at least to a last verified block number of one or more verified blocks.

5. The device of claim 4, wherein the memory is further configured to store at least one of a public key, a private key, or an asymmetric key pair.

6. The device of claim 1, wherein the one or more processors are further configured to insert a public authentication key into the candidate block when the one or more processors verify the candidate block.

7. The device of claim 1, wherein the one or more processors are further configured to determine a block number of the candidate block by incrementing a block number of a last verified block.

8. The device of claim 1, wherein the one or more processors are further configured, when the candidate block identifier is identical to any one of the stored one or more verified block identifiers, to log a user identifier corresponding to a user submitting the candidate block for verification.

9. The device of claim 8, wherein the one or more processors are further configured not to verify a candidate block corresponding to the user identifier for whom a predetermined number of candidate blocks were not verified based on their candidate block identifier being identical to any one of the stored one or more verified block identifiers.

10. The device of claim 1, wherein the one or more processors are further configured to delay verification of a candidate block until completion of a predetermined time duration.

11. The device of claim 1, wherein the user stake is a user stake according to a proof of stake algorithm.

12. The device of claim 1, wherein verifying the candidate block comprises verifying a block signature of the candidate block and signing the block according to one or more digital keys.

13. The device of claim 1, wherein verifying the candidate block comprises verifying a hash value of the candidate block by recalculating the hash value.

14. The device of claim 1, wherein the one or more processors are further configured to determine a user stake and compare the determined user stake to a predetermined user stake threshold, and when the user stake is less than the predetermined user stake threshold, to disable verification of the candidate block.

15. The device of claim 1, wherein the predetermined condition is at least one of the candidate block identifier being greater than the stored one or more verified block identifiers, the candidate block being more recent than the stored one or more verified block identifiers, and/or the candidate block identifier not being duplicative of any of the store one or more block identifiers.

16. The security controller of claim 1, wherein the security controller comprises a trusted processing environment, and wherein the one or more processors are configured to perform at least one of comparing the received candidate block identifier with a block identifier in the stored one or more verified block identifiers or verifying the candidate block corresponding to the candidate block identifier in the trusted processing environment.

17. The security controller of claim 1, wherein the security controller is configured as, or as a component of, a smart card.

18. The security controller of claim 1, wherein the security controller is configured as a Java Card Applet or configured to operate using instructions configured as a Java Card Applet.

19. A method of root-of-trust blockchain verification comprising:
    receiving in a security controller a candidate block identifier corresponding to a block number of a candidate block of a distributed electronic ledger;
    receiving one or more verified block identifiers each corresponding to a block number of one or more verified blocks and storing the one or more verified block identifiers in a memory of the security controller;
    comparing the received candidate block identifier with a block identifier of the stored one or more verified block identifiers;
    storing a user stake in a memory of the security controller;
    denying access to the user stake in the memory of the security controller and not verifying the candidate block corresponding to the candidate block identifier upon determining that the comparing of the received candidate block identifier to the block identifier of the one or more verified block identifiers does not satisfy a predetermined condition; and
    verifying the candidate block corresponding to the candidate block identifier and sending data corresponding to a verified block of the distributed electronic ledger, upon determining that the comparing of the received candidate block identifier to the block identifier in the one or more verified block identifiers satisfies the predetermined condition;
    wherein the security controller is configured as, or as a component of, a physical electronic authorization device that is configured to be removably coupled with a blockchain mining device.

20. The method of root-of-trust blockchain verification of claim 19, further comprising, when the candidate block identifier is identical to any one of the one or more verified block identifiers, declining verification of the candidate block corresponding to the candidate block identifier.

21. The method of root-of-trust blockchain verification of claim 19, further comprising, when the candidate block identifier is identical to any one of the one or more verified block identifiers, logging a user identifier corresponding to a user submitting the candidate block for verification.

22. The method of root-of-trust blockchain verification of claim 21, further comprising disabling verification of a candidate block corresponding to the user identifier for whom a predetermined number of candidate blocks were not verified based on their candidate block identifier being identical to any one of the one or more verified block identifiers.

23. A non-transitory computer readable medium comprising instructions that, when executed, are configured to cause one or more processors to
    receive in a security controller a candidate block identifier corresponding to a block number of a candidate block of a distributed electronic ledger;
    receive one or more verified block identifiers each corresponding to a block number of one or more verified blocks and store the one or more verified block identifiers in a memory of the security controller;
    compare the received candidate block identifier with a block identifier in the one or more verified block identifiers;
    not verify the candidate block corresponding to the candidate block identifier upon determining that the comparing of the received candidate block identifier to the block identifier in the one or more verified block identifiers does not satisfy a predetermined condition; and
    verify the candidate block corresponding to the candidate block identifier and sending data corresponding to a verified block of the distributed electronic ledger, upon determining that the comparing of the received candidate block identifier to the block identifier in the one or more verified block identifiers satisfies the predetermined condition;
    wherein the instructions are further configured to cause the one or more processors to store a user stake in a memory within the secured controller, and wherein the one or more security processors are configured to deny a user access to the stake when the comparing of the candidate block identifier to the block identifier of the one or more verified block identifiers does not satisfy the predetermined condition;
    wherein the security controller is configured as, or as a component of, a physical electronic authorization device that is configured to be removably coupled with a blockchain mining device.

* * * * *